(12) United States Patent
Peacock

(10) Patent No.: US 8,291,460 B1
(45) Date of Patent: Oct. 16, 2012

(54) RATE ADAPTATION BASED ON DYNAMIC PERFORMANCE MONITORING

(75) Inventor: Gavin Peacock, Walnut Creek, CA (US)

(73) Assignee: Adobe Systems Incorporated, San Jose, CA (US)

( * ) Notice: Subject to any disclaimer, the term of this patent is extended or adjusted under 35 U.S.C. 154(b) by 408 days.

(21) Appl. No.: 12/750,630

(22) Filed: Mar. 30, 2010

Related U.S. Application Data

(60) Provisional application No. 61/304,191, filed on Feb. 12, 2010.

(51) Int. Cl.
  *H04N 7/173* (2011.01)
(52) U.S. Cl. .............. 725/93; 725/94; 725/95; 725/90
(58) Field of Classification Search .................. None
  See application file for complete search history.

(56) References Cited

U.S. PATENT DOCUMENTS

| | | | |
|---|---|---|---|
| 7,450,130 B2 | 11/2008 | Swedberg et al. | |
| 2003/0140159 A1 | 7/2003 | Campbell et al. | |
| 2004/0156624 A1* | 8/2004 | Kent et al. ............... | 386/125 |
| 2004/0179618 A1 | 9/2004 | Romriell et al. | |
| 2005/0120391 A1* | 6/2005 | Haynie et al. ............. | 725/135 |
| 2005/0128220 A1 | 6/2005 | Marrin et al. | |
| 2006/0026294 A1* | 2/2006 | Virdi et al. ............... | 709/232 |
| 2007/0271388 A1* | 11/2007 | Bowra et al. ............. | 709/231 |
| 2009/0185625 A1* | 7/2009 | Lee et al. ................. | 375/240.26 |

OTHER PUBLICATIONS

Wapole, Jonathan et al., "A Player for Adaptive MPEG Video Streaming Over the Internet", Proceedings, 1997, 12 pages, In Proceedings 26th Applied Imagery Patter Recognition Workshop AIPR-97, Department of Computer Science and Engineering, Oregon Graduate Institute of Science and Technology, Oregon, USA.

* cited by examiner

*Primary Examiner* — Brian Pendleton
*Assistant Examiner* — Cai Chen
(74) *Attorney, Agent, or Firm* — Fish & Richardson P.C.

(57) ABSTRACT

Methods, systems, and apparatus, including computer programs encoded on a computer storage medium, can dynamically monitor the performance of media content rendering and adjust the rate as needed. This can involve obtaining media data, where a first type of dynamic data has a lower priority than a second type; identifying a target frame rate; monitoring a first amount of time used to process the first type of data and a second amount of time used to process the second type of data, including combining multiple first time measurements into the first amount of time and combining multiple second time measurements into the second amount of time; comparing a combination of the first amount of time and the second amount of time to the target frame rate; and modifying an allocation for processing the first type of dynamic data, if the combination fails to satisfy the target frame rate.

20 Claims, 4 Drawing Sheets

RATE ADAPTATION BASED ON DYNAMIC PERFORMANCE MONITORING

CROSS-REFERENCE TO RELATED APPLICATIONS

This application claims priority to U.S. Application Ser. No. 61/304,191, filed on Feb. 12, 2010, and entitled, "Rate Adaptation Based on Dynamic Performance Monitoring".

BACKGROUND

This specification relates to programs executed in conjunction with media content rendering.

The Internet is widely used to distribute media content, including video, graphic, audio, and scripting data. In addition, media content can include associated metadata that provides information about the content to be rendered such as author, publication and licensing information. Moreover, metadata can also include a recommended frame rate for media playback. Media content can be downloaded as a file, or streamed to a client computer, where a media player application can process and output the media content to a display device and, if applicable, one or more speakers. The media player application or an application including media player functionality, in some examples, can be a program written for a particular operating system (OS) on a computer platform or a "plug-in" based software that runs inside another program, such as a runtime environment, on a computer platform.

Media content developed within a scripting language includes at least a scripting portion and a graphic portion, as well as other optional data portions such as audio. For each frame of a frame-based media content developed within a scripting language, for example, processing time can be devoted to first interpreting the scripting data and then rendering the graphic (e.g., video, animation, still image, etc.) data. Examples of scripting languages include ACTION-SCRIPT™ by Adobe Systems Incorporated of San Jose, Calif., JAVASCRIPT™ by Sun Microsystems Incorporated of Santa Clara, Calif., PYTHON® by Python Software Foundation (PSF), and Ruby by Yukihiro Matsumoto.

The rate at which media content is presented upon a user device can depend upon a number of factors, including timing information received within an audio track, a developer suggested frame rate, or a device refresh rate. If the media content is not locked to timing information such as an audio track, the actual frame rate can depend upon the processing rate of the user device. If the processor is too slow, or the processor has too many applications vying for processing time at once, the frame rate of particular media content rendered upon the user device can slow to a frame rate which is too slow for the user to properly experience. For example, the media content can appear to be stalled or choppy.

SUMMARY

This specification describes technologies relating to programs that are obtained and performed in conjunction with media content rendering.

In general, one innovative aspect of the subject matter described in this specification can be embodied in methods that include the actions of obtaining media data to process and display to a display device, the media data including multiple frames and having at least two discrete types of dynamic data for each of the multiple frames, where a first of the at least two discrete types of dynamic data has a lower priority than a second of the at least two discrete types; identifying a target frame rate associated with the media data; monitoring a first amount of time used to process the first type of dynamic data and a second amount of time used to process the second type of dynamic data, where the monitoring includes combining multiple first time measurements corresponding to multiple frames for the first type of dynamic data into the first amount of time and combining multiple second time measurements corresponding to multiple frames for the second type of dynamic data into the second amount of time; comparing a combination of the first amount of time and the second amount of time to the target frame rate; modifying an allocation for processing the first type of dynamic data, when the combination fails to satisfy the target frame rate, to change an actual frame rate of the media data being processed and displayed to the display device; and repeating the monitoring, the comparing and the modifying, with hysteresis between the time measurements and the modifying. Other embodiments of this aspect include corresponding systems, apparatus, and computer programs, configured to perform the actions of the methods, encoded on computer storage devices.

These and other embodiments can each optionally include one or more of the following features. The identifying can include determining an upper rate of the target frame rate and a lower rate of the target frame rate; the comparing can include comparing the combination to the lower rate and comparing the combination to the upper rate; and the modifying can include modifying the allocation if the combination fails to satisfy the lower rate or if the combination fails to satisfy the upper rate and the allocation, after modification, satisfies a minimum value associated with processing the first type of dynamic data. Moreover, combining the multiple first time measurements can include calculating a first rolling average of the first time measurements, and combining the multiple second time measurements can include calculating a second rolling average of the second time measurements.

Obtaining the media data can include obtaining the media data including video data and scripting data, monitoring the first amount of time used to process the first type of dynamic data can include determining a time per frame spent rendering the video data, and monitoring the second amount of time used to process the second type of dynamic data can include determining a time per frame spent interpreting the scripting data. If the media data does not include per frame timing data, the target frame rate can be derived from information separate from the media data.

Modifying the allocation can include modifying the allocation when the combination fails to satisfy the target frame rate and the modified allocation still satisfies a lower limit set for processing the first type of dynamic data, the modified allocation being determined by calculating a ratio of skipped frames to processed frames; and, for each frame of the media data, processing the first type of dynamic data can include processing the frame or skipping the frame based upon the ratio. Comparing the combination to the target frame rate can include comparing in accordance with an inequality, $(NS+CR)/N>F$, where $N$ corresponds to a sample size for the multiple frames of the first type of dynamic data and the multiple frames of the second type of dynamic data, $C$ corresponds to the allocation, $R$ corresponds to the first amount of time, $S$ corresponds to the second amount of time, and $F$ corresponds to the target frame rate.

Other innovative aspects of the subject matter described in this specification can be embodied in a computer storage medium encoded with a computer program including instructions that when executed by data processing apparatus cause the data processing apparatus to perform operations as described. In addition, a system can include a display device;

a computer storage medium; and one or more processors operable to interact with the display device and to perform operations as described. The display device, the medium and processor(s) can be part of single consumer electronic device, such as a mobile telephone, a personal digital assistant (PDA), a mobile audio or video player, etc. Alternatively, the display device, the medium and processor(s) can be divided among two or more distinct components, which can be locally connected or remotely connected by a network.

Particular embodiments of the subject matter described in this specification can be implemented so as to realize one or more of the following advantages. A dynamic performance monitoring and rate adapting program can be used to maintain an acceptable frame rate during frame-based media content rendering by reducing portions of the frame rendering effort. By monitoring the processing time used to process two or more discrete types of dynamic data, rate adaptation can be applied to frame-based media content in implementations where there is no specific time key for fixing a target frame rate. This monitoring method, for example, can help to keep non-audio synchronized media content running at a more reasonable rate by reducing some rendering tasks when necessary. Through the application of hysteresis within the monitoring process, the monitoring program can balance the effect of rate adaptation over time and incorporate feedback regarding the impact of previously applied modifications of the rendering effort.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Media content may, but need not, correspond to a file. Media content may be stored in a portion of a file that holds other digital content, in a single file dedicated to the media content in question, or in multiple coordinated files.

While the terms time and frame rate are both included within the subject matter, the terms time and rate may be used interchangeably when applying the concepts to a specific implementation. For example, although in a part of the description a comparison is made based upon time, in another implementation the comparison may be made based upon differing rates. Additionally, acceptable frame rate or target frame rate may refer to either a single value or a range of values.

Figure 1:
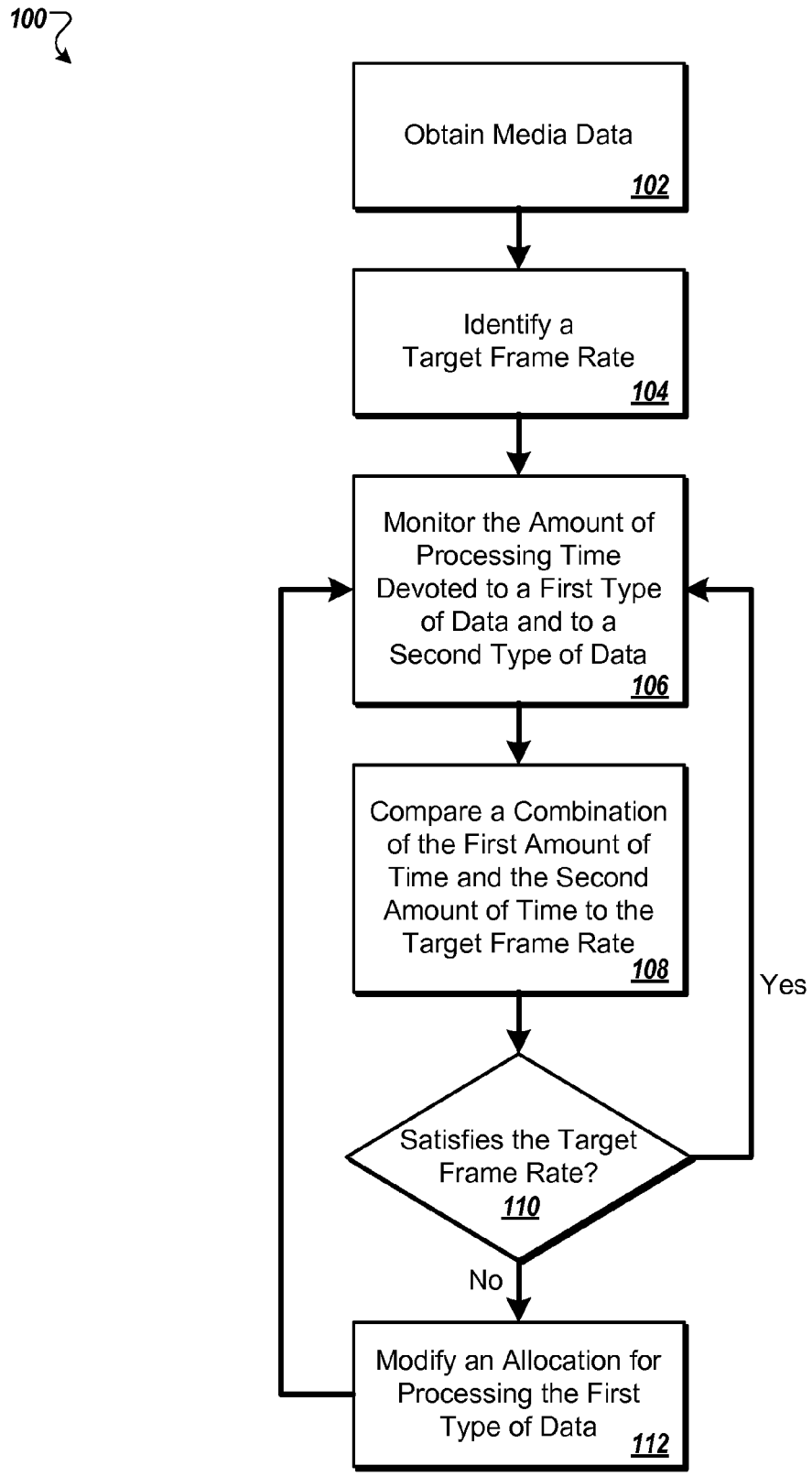
FIG. 1 is a flowchart showing an example of a process of maintaining an acceptable frame rate by reducing portions of the frame rendering effort.

FIG. 1 is a flowchart showing an example of a process 100 of maintaining an acceptable frame rate by reducing portions of the frame rendering effort. At a high level, during the process 100, frame-based media content, composed of at least two types of discrete data, is processed and displayed to a display device while the processing time for each type of data is monitored. If it is found that the overall frame rate is lagging, the processing allocation for the lower priority type of discrete data can be adjusted accordingly. The process 100, for example, can be performed within a media player application, web browser, or other application which can play frame-based media content composed of at least two discrete types of data.

The process 100 begins with obtaining frame-based media data (102) having at least two discrete types of data for each of the multiple frames. For example, the media data may include both video data and scripting data. One of the two types of data (e.g., video data) can be considered as having a lower priority than the second type of data (e.g., scripting data). In any case, the media data can be actively retrieved from a local or remote source, or be passively received, as from a streaming media server.

A target frame rate is identified (104). In some implementations, the target frame rate can be set based upon per-frame timing data within the media data, such as audio track information. In other implementations, the media data does not include per-frame timing data. If the developer of the media data has included frame rate information, such as a maximum frame rate, target frame rate, or minimum frame rate, the target rate can be set based upon this information. For example, a suggested frame rate within the media data can be compared to the processing abilities of the device upon which the process 100 is performed, or the refresh rate of the display device, to determine the target frame rate.

If no frame rate information exists within the media data, a target frame rate can be derived from information separate from the media data. In some implementations, the target frame rate can be based upon the hardware capabilities of the computing device, the refresh rate of the display device, the processing needs of concurrent applications running upon the computing device, available battery power of the computing device, the visual capabilities of the human eye, or a combination thereof. In other implementations, a default target frame rate can be applied.

In some implementations, the target frame rate refers to a range of values. For example, a target frame rate can be set to range between a trigger rate, at which the process 100 can begin to apply adjustments to improve frame rate when the actual frame rate is below or equivalent to this value, and a maximum adjustment rate, at which the process 100 can cease to apply adjustments. For example, based upon a requested frame rate of sixty frames per second, a configured maximum rate of fifty frames per second, and a minimum acceptable frame rate of thirty frames per second, the target frame rate may range between a trigger rate of thirty frames per second and a maximum adjustment rate of fifty frames per second (e.g., the lower of the requested value or the configured value). If the actual frame rate, for example, falls below or at thirty frames per second, the process 100 can apply processing adjustments until the actual frame rate is calculated at or above fifty frames per second. In other implementations, the target frame rate can be specified in terms of processing times (e.g., from twenty milliseconds to thirty-three milliseconds).

The amount of processing time devoted to the first type of data, and, similarly, the amount of processing time devoted to the second type of data are monitored (106). In some implementations, the monitoring occurs over a sample number of frames. For example, over a processing period of thirty frames, first time measurements of the time spent rendering the video data within each frame can be collected, while second time measurements of the time spent interpreting the scripting data within each frame can be collected. In other implementations, the monitoring occurs over a set period of time. For example, within a time period of one second (e.g., approximately forty frames if a target frame rate of forty frames per second is being maintained), X first time measurements and X second time measurements can be collected, pertaining to the time spent rendering video data and time spent interpreting scripting data.

The first time measurements can be combined into a first amount of time, and the second time measurements can be combined into a second amount of time. In some examples, the combination can include calculating an average first time measurement and an average second time measurement, calculating a median first time measurement and a median second time measurement, or calculating a total first time including a summation of the sample number of first time measurements and calculating a total second time including the summation of the sample number of second time measurements.

If, within one or more of the sample number of frames, the first time measurement or the second time measurement is significantly larger than a typical time measurement related to the processing of the first type of data or the second type of data, in some implementations, the value can be discarded. For example, a first time measurement exceeding a first data processing threshold or a second time measurement exceeding a second data processing threshold can cause the discard of the first time measurement and, optionally, the second time measurement for that particular frame (e.g., that frame is not considered when combining values into the first amount of time and the second amount of time). An unusually large measurement can occur, in some examples, due to a temporary glitch in the network during sharing information with a remote source (e.g., uploading statistics, downloading information, etc.), a temporary spike of processor demand upon the computing device where the media content is being processed, or an unusually complex frame of data within the media content.

The first amount of time and the second amount of time are combined and compared to the target frame rate (108). For example, the average or median first time measurement and the average or median second time measurement can be summed to create an average or median frame processing time which can be compared to the target frame rate. The total first time and the total second time, in another example, can be combined and averaged to obtain an average frame processing time, which can be compared to the target frame rate.

If the combination satisfies the target frame rate (110), the process 100 returns to monitoring the amount of processing time (106). For example, if the combination meets or exceeds the target frame rate, the process 100 can continue to make measurements towards a rolling average and comparing a combination of the first time and the second time derived from the rolling average to ensure that the target frame rate continues to be satisfied. If, in another example, there is a desire to reduce processor load or to extend battery life, one or more actions can be taken to encourage a lower the actual frame rate in an attempt to relieve system resources.

If the combination, instead, does not satisfy the target frame rate (110), an allocation for processing the first type of data is modified (112) to change the actual frame rate of the media data being processed and displayed to the display device. In some implementations, for one or more of the sample number of frames, the processing of the first type of data is modified. For example, video rendering can be skipped for one or more frames, the complexity of video rendering can be reduced for one or more frames, or a reduced set of video rendering operations can be applied for one or more frames. If the processing allocation for the first type of data was previously modified, a target frame position can optionally be selected to smooth out the effect of the processing allocation reduction. For example, if, previously, every thirtieth frame incurred processing modification, now every fifteenth and thirtieth frame can incur processing modification. In another example, a ratio of processing-modified frames to standard processing frames can be determined, and frames can incur modification at the determined rate.

In other implementations, the difference between the total processing time allocated to the sample number of frames and the desired processing time for the sample number of frames can be used to derive an excess processing time. For example, the processing time in excess of the target processing time (e.g., a sample number of thirty frames at a target frame rate of sixty frames per second would generate a target processing time of one half second) can be subtracted from the allocation for processing the first type of data (e.g., the combination of the first time measurements or the average of the first time measurements multiplied by the number of sample frames). During the next sample number of frames, the first type of data can cease to be processed once the new processing allocation has been spent.

In some embodiments, the decision to modify the allocation for processing the first type of data can additionally depend upon a lower processing threshold. For example, it may be determined that video rendering should occur at least four times per second so that the display does not appear to be locked up in the eye of the viewer. Before modifying the allocation for processing the first type of data, for example, it can be determined whether the allocation has already reached a lower threshold level.

In other embodiments, if the combination satisfies the target frame rate (110), and it is found that an allocation for processing the first type of data was previously modified, the allocation for processing the first type of data can be modified to increase the processing allocation towards the first type of data. For example, if the processing demands upon the computing device have lowered (e.g., one or more processes completed, one or more competing applications terminated, etc.), the target frame rate may be achievable without the same level of processing allocation modification previously put to use. In determining whether the combination of the first amount of time and the second amount of time is significantly lower than the target frame rate, the average processing time of the first type of data may optionally be considered. For example, to allocate processing towards a single data frame, the combination may have to be shorter than the target frame rate by at least a multiple of the average processing time of the first type of data (e.g., double, triple, etc.). An increase of processing allocation can be applied by applying a reversal of the reduction in processing allocation previously applied. For example, one or more targeted frames within the sample number of frames may be returned to a standard processing allocation.

Figure 2:
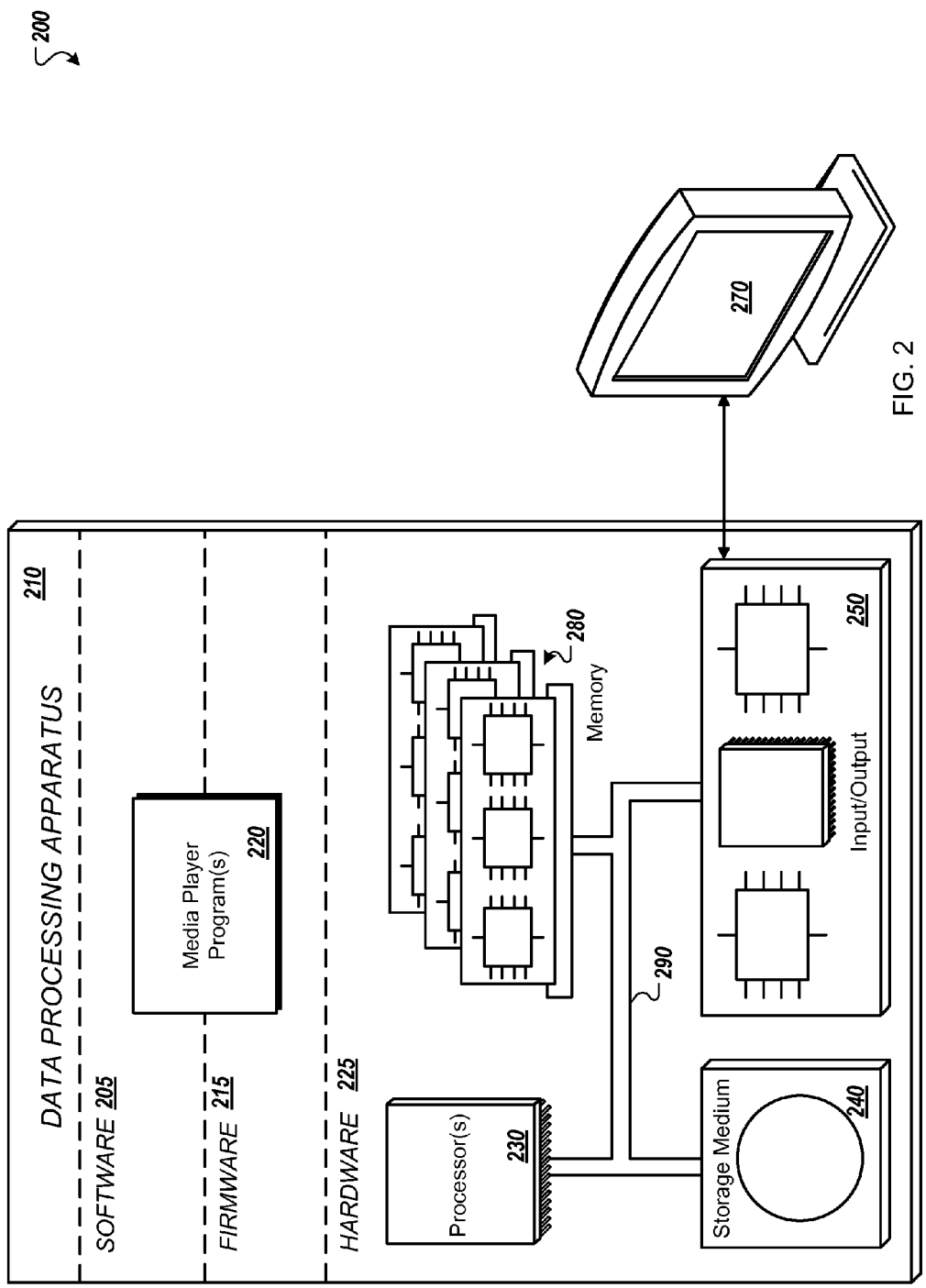
FIG. 2 is a block diagram showing an example of a computer system including one or more media player programs.

FIG. 2 is a block diagram showing an example of a computer system 200 including one or more media player programs 220. A data processing apparatus 210 can include hardware 225, firmware 215 and one or more software programs 205, including the media player program(s) 220. The media player program(s) 220 operate in conjunction with the data processing apparatus 210 to effect various operations described in this specification. The media player program(s)

220, in combination with the various hardware 225, firmware 215, and software 205 components of the data processing apparatus 210, represent one or more structural components in the system 200, in which the algorithms described herein can be embodied.

The media player program(s) 220 can be one or more applications for processing and outputting media content (e.g., audio, video, graphical, and/or textual data) to one or more output devices such as a display device 270 and, optionally, one or more speakers. An application refers to a computer program that the user perceives as a distinct computer tool used for a defined purpose. An application can be built entirely into an operating system or other operating environment, or it can have different components in different locations (e.g., a remote server). The media player program(s) 220 can include or interface with other software. The media player program(s) 220 can include a stand alone media player program, a media player program that relies on a runtime environment to operate (e.g., a JAVA® virtual machine or an Adobe AIR® runtime environment), or multiple different media player programs, which can be stand alone, browser-based, or runtime environment-based, in some examples.

Interface software can also be included that operates over a network to interface with other processor(s), such as in a computer used by a digital content provider. For example, the media player program(s) 220 can include software methods for sending information to another computer accessible over the Internet for aggregation and analysis of media viewing statistics.

The hardware level 225 of the data processing apparatus 210 includes one or more processors 230, a memory 280, and at least one computer-readable medium 240 (e.g., random access memory, storage device, etc.). The hardware level 225 can also include one or more input/output devices 250, including one or more user interface devices.

Each of the components 230, 240, 250, and 280 are interconnected using a system bus 290. The processor(s) 230 can process instructions for execution within the system 200. In some implementations, one or more single-threaded processors can be included within the processor(s) 230. In other implementations, one or more multi-threaded processors can be included within the processor(s) 230. In some implementations, the processor(s) 230 can process instructions stored in the memory 280, or on the storage device 240, to display graphical information on the display device 270.

The memory 280 can be a computer-readable medium used to store information within the system 200 and can include a volatile memory unit, a non-volatile memory unit, or both. The storage device 240 can provide mass storage for the system 200. The storage device 240 can include a floppy disk device, a hard disk device, an optical disk device, or a tape device.

The input/output devices 250 provide input/output operations for the system 200. The input/output devices 250 can include a keyboard, mouse, stylus or pointing device, a display unit for displaying graphical user interfaces such as the display device 270, a modem or other networking hardware/firmware, or any combination thereof to name a few examples.

The subject matter described in this specification can also be used in conjunction with other input/output devices, such as a printer or scanner. An input/output device can be used to connect to a network, and can furthermore connect to one or more processors via the network (e.g., the Internet).

Therefore, a user of the media player program(s) 220 does not need to be local, and may be connecting in a wired or wireless fashion using an internet or intranet connection on a personal computer, personal digital assistant (PDA), smartphone (e.g., a cellular phone including an operating system and advanced computing capabilities), or using other suitable hardware and software at a remote location. For example, a user can access a web interface via a remote processor in order to view media content. In any event, data can be transmitted over the network to/from the data processing apparatus 210. Note that the data processing apparatus 210 can itself be considered a user interface device (e.g., when the media player program(s) 220 is delivered by a remote server as a web service).

The system 200 can be used to render frame-based media content through dynamically adjusting processing allocation based upon a target frame rate. For example, during processing of media data by the media player program(s) 220, first time measurements and second time measurements can be collected by the processor(s) 230 and temporarily stored within the memory 280, based upon, for example, a system clock value maintained by the system 200 (e.g., processor clock output). The media content can be rendered to the display 270. In absence of target frame rate information within the media data, the target frame rate can, in part, be based upon the processing speed of the processor(s) 230 or the refresh rate of the display device 270. While rendering the frame-based media content, in some implementations, the media player program(s) 220 can collect statistics based upon the dynamic adjustment of frame rate, storing these statistics within the memory 280 or the storage medium 240, or sharing these statistics with a media server connected to the data processing apparatus 210 via a network connection.

Figure 3:
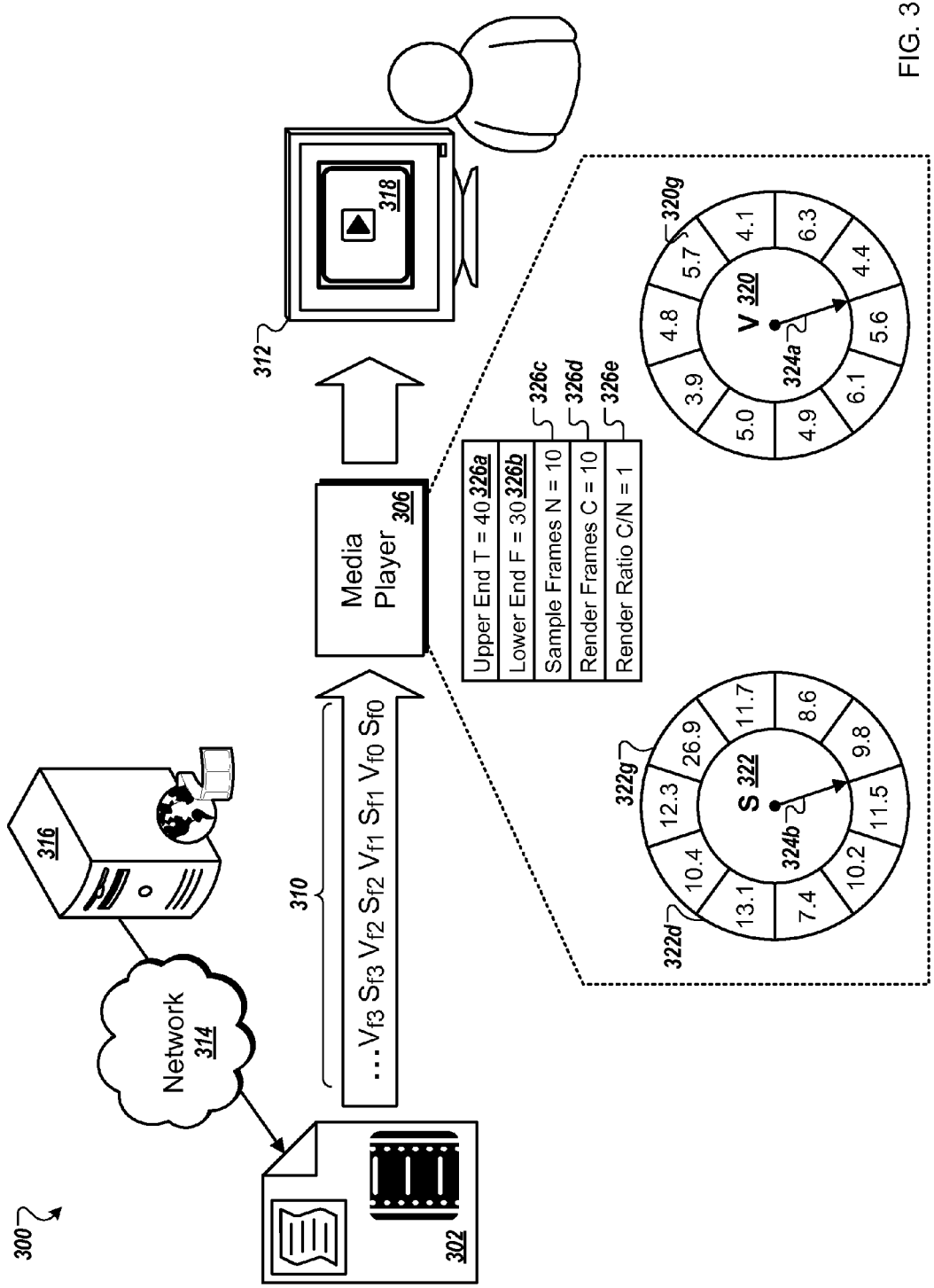
FIG. 3 is a block diagram showing an example of a system and process of monitoring frame rate performance while rendering video data and interpreting scripting data within frame-based media content.

FIG. 3 is a block diagram showing an example of a system and process 300 of monitoring frame rate performance while rendering video data and interpreting scripting data within frame-based media content 302. The system and process 300 involves a media player 306 that renders and interprets multiple frames (f) 310 of video data (V) and scripting data (s) when presenting content on output device(s) including a display 312. The process 300 additionally uses a network connection 314 to one or more remotes sites 316. The process 300, for example, can be used to dynamically adjust the frame rate of the media content 302 by reducing portions of the frame rendering effort.

When a user interacts with a graphical user interface (GUI) 318 of the media player 306 to view the media content 302, the media player 306 obtains the media content 302 from a local or remote location. In some examples, the media content 302 can be downloaded from the remote site 316 over the network 314, streamed from a media server remote site 316 over the network, or read by the media player 306 from a local or networked storage device, such as the storage medium 240 described in relation to FIG. 2. The media player 306 can set a target frame rate for the media content 302 based upon timing information within the media content 302, the hardware capabilities of the computing system running the media player 306 (e.g., processor speed, display refresh rate, etc.), or other factors. In some implementations, the target frame rate can reflect a downward adjustment of requested frame rate due to battery consumption concerns (e.g., low battery) or a mismatch between requested frame rate and hardware capabilities (e.g., requested rate faster than display refresh). The target frame rate can refer to a single value or a range of values. For example, the target frame rate can include an upper rate T 326a and a lower rate F 326b. The media player 306 can additionally set a lower limit for processing the video data, for example, based upon a video update rate which can provide the user with an acceptable viewing experience.

During rendering of each frame f(n) 310, the media player application 306 can measure the time used to render the video data $V_{f(n)}$ and the time used to interpret the scripting data $S_{f(n)}$. Interpretation of the scripting data, for example, may take priority over rendering the video data, because the scripting data can, in part, include instructions for dynamic drawing and animation to be rendered in real time upon the user screen. Future frames of scripting data can build upon these instructions such that, if a frame of scripting data has been lost, the visual experience for the user can be compromised. When adjusting or dropping frames of video rendering, although choppiness may be introduced into the video display, an adequate video experience can be maintained.

Within the implementation illustrated, the video data time measurements can be stored within a first circular queue V 320, and the scripting data time measurements can be stored within a second circular queue S 322. Each circular queue 320, 322 includes a pointer 324 to the next slot available for measurement storage out of a sample number 326c (e.g., ten, as illustrated) slots. If, due to a previous adjustment of processing allocation for the video data V, the video processing is skipped for one or more of the sample number of frames, the application can enter a zero into the slot of the circular queue V 320 associated with each skipped frame. Alternately, an actual processing time (e.g., time to collect statistics, find next frame, etc.) which may have occurred in relation to the skipped frame can be entered into the associated slot. The sample number 326c, in some implementations, can be based, in part, upon the target frame rate. For example, the media player 306 may set a sample number of ten for a target frame rate of ten frames per second or a sample number of thirty for a target frame rate of thirty frames per second. In other implementations, the sample number 326c can be a static value or a setting based upon hardware capabilities (e.g., display refresh rate, processor speed, etc.).

In some implementations, if a video rendering time measurement or a scripting interpretation time measurement is outside of a threshold range, the time measurement can be discarded. For example, the circular queue S 322 includes values ranging from 7.4 (e.g., milliseconds) to 26.9. The largest value 322g is 26.9, while the second-largest value 322d is 13.1. Because the largest value 322g is more than double the second-largest value 322d, the largest value 322g may cause the average scripting interpretation time, as calculated based upon the values contained within the circular queue S 322, to be an unusually large number. In this case, the media player 306 may choose to discard the largest value 322g. When discarding the largest value 322g, the corresponding video rendering measurement can optionally be discarded as well, namely the value 320g of 5.7 (e.g., milliseconds).

Once the time measurements have been stored and, optionally, culled for misleading measurements, the time measurements can be combined and compared to the target frame rate (e.g., the upper rate T 326a or the lower rate F 326b). For example, the average time measurement within the circular queue S 322, not including the discarded value 322g, is 10.9. The average time measurement within the circular queue V 320, not including the discarded value 320g, (i.e., an adjusted rolling average) is 5.0. In combination, the average processing time per frame is 15.9 milliseconds. For an upper rate T of 40 frames per second, each frame on average can take 25 milliseconds to process. For a lower rate F of 30 frames per second, each frame on average can take 33.3 milliseconds to process. Thus, the average calculated by the media player 306 is well within this boundary.

The process 300 can continue by advancing both of the pointers 324 to the next position within the circular queues 320 and 322, updating a rolling average and comparing the rolling average to the target frame rate. If, at some point in time, the average processing time exceeds the target frame rate, the processing allocation for rendering video data can be adjusted accordingly. In some implementations, the processing allocation is not modified until the average processing time meets or exceeds the lower rate F (e.g., 33.3 milliseconds). The processing allocation can continued to be modified, in this example, until the average processing time is equal to or less than the upper rate T (e.g., 25 milliseconds).

In one example, when modifying the processing allocation, the media player 306 may decrement the number of frames having the video data rendered per sample number of frames (e.g., render nine out of ten frames). This value can be stored by the media player 306 as a number of render frames C, initialized to be equal to the number of sample frames N (e.g., 10). Additionally, the media player 306 can calculate a ratio of rendered frames to total frames C/N 326e. The ratio 326e, for example, can be applied to the processing of the video rendering for subsequent frames within the media content 302. In this manner, the modification of processing allocation can be applied evenly throughout the frames of the next sample period (e.g., sample number 326c of 10 frames).

The process can then continue to collect processing times through another sample period. Through monitoring the rolling average of a full sample period, rather than analyzing individual frame processing times, the process 300 can make adjustments based upon predictions and monitor the effect of the adjustment over a period of time (e.g., the sample size), taking into consideration the hysteresis of the processing allocation adjustment before applying additional adjustments. When applying any additional adjustments, the lower limit of the decrement operation, in some implementations, can optionally be monitored by the media player 306 to verify that the user receives some sort of meaningful visual updating at the display 312 while the media player 306 attempts to improve the overall frame rate while continuing to interpret scripting data.

In addition to, or instead of skipping the rendering of the video data for every N number of frames, the media player 306 can tune out or tune down special graphics effects, lower the quality of static images, reduce or modify the manner in which animation is generated, or limit the processing of non-essential portions of the display (e.g., stop rendering advertisements in association with content).

During the process 300, the media player 306 can optionally collect statistics regarding the processing of the media content 302, such as average frame rates, expected frame rate, target frame rate, lower limit of video data processing, number of frames of video data skipped to maintain frame rate, or estimated percent quality degradation to maintain target frame rate. These or other statistics, in some implementations, can be uploaded via the network 314 to be shared with the media server 316 from which the media content 302 originated.

Figure 4:
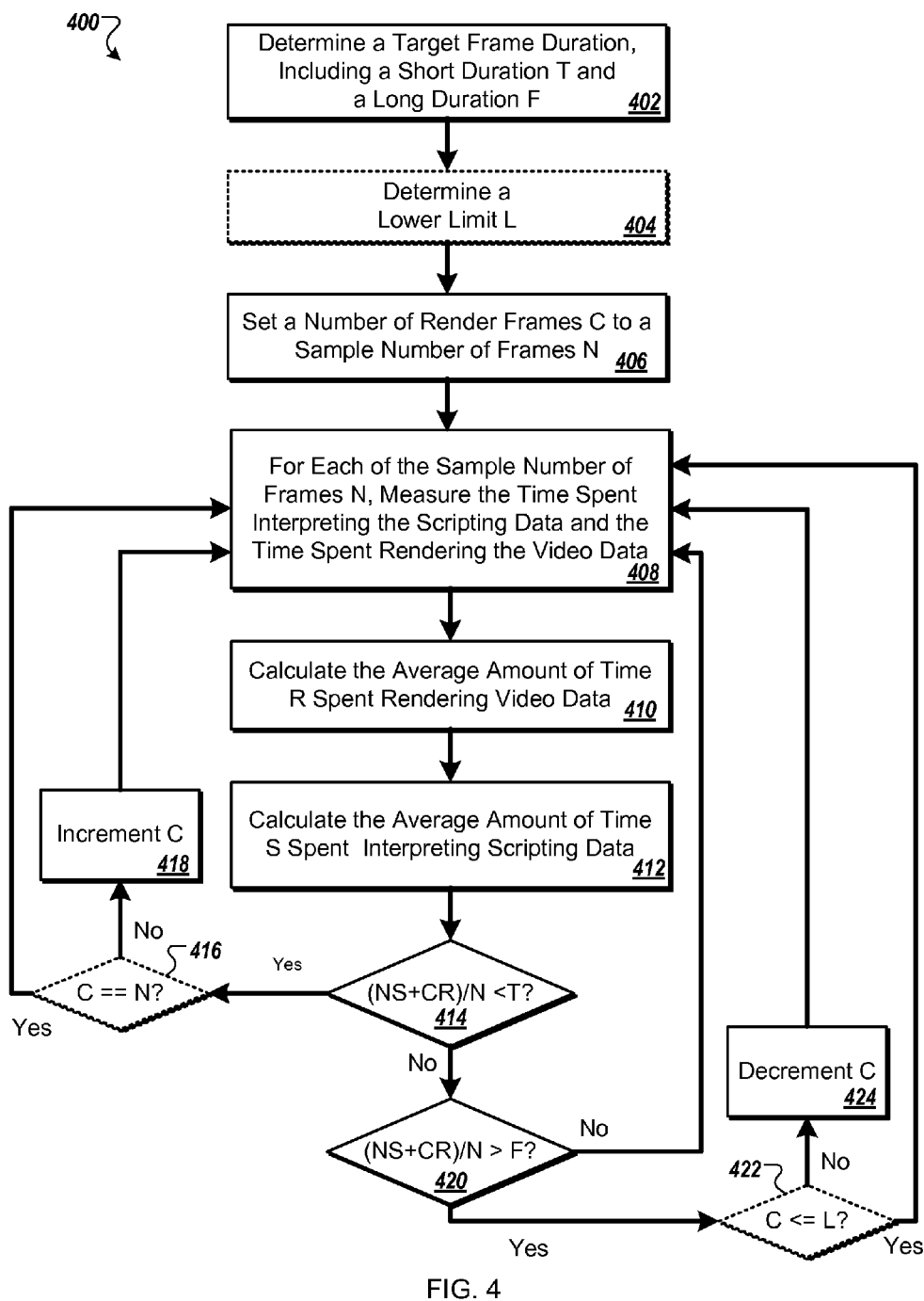
FIG. 4 is a flowchart showing an example of an algorithm for monitoring frame rate performance and applying rate adaptation.

FIG. 4 is a flowchart showing an example of an algorithm 400 for monitoring frame rate performance and applying rate adaptation within frame-based media data containing at least a first (lower priority) data type and a second (higher priority) data type. The algorithm 400, for example, may be used by the media player 306 while rendering the media content 302, as described in relation to FIG. 3.

The algorithm 400 begins with determining a target frame duration based on a target frame rate (402). The target frame rate, for example, can be determined from information within or outside the media data, depending, in part, upon the contents of the media data (e.g., whether or not any timing-related information has been provided). The target frame rate can be considered to be a range of frame rates, beginning at a lower rate, corresponding to a long duration F and ending at an upper rate, corresponding to a short duration T. The long duration F and the short duration T, in some implementations, can be used to determine a starting point (e.g., longer than the long duration F) and a stopping point (e.g., shorter than the short duration T) for making processing allocation modifications.

A lower limit L, corresponding to a minimum processing allocation towards processing the lower priority data of two data types, is optionally determined (404). The lower limit, for example, can be set to provide a minimum experience at the user interface (e.g., the media data rendering does not appear to have locked up or otherwise become unreasonable to view). The lower limit L, in some examples, can be calculated based upon a minimum user interface update rate, a minimum processing time allocation (e.g., actual time or percentage of total processing time per frame), or a maximum percentage of frames affected by a processing allocation modification.

A number of render frames C is initialized to a sample number of frames N (406). The sample number of frames N, for example, can be used as the basis for collecting time measurements regarding the processing of the media data prior to determining whether to adjust a processing allocation for the lower priority data type. The number of render frames C, for example, refers to the number of frames, out of the sample number of frames N, which continue to be rendered as normal after a processing adjustment has been made.

For each of the sample number of frames N, the time spent interpreting the scripting data is measured and the time spent rendering the video data is measured (408). These individual time measurements, for example, can be stored in a temporary memory location.

Based upon the time measurements associated with rendering the video data, the average amount of time R spent is calculated (410). Similarly, based upon the time measurements associated with interpreting the scripting data, the average amount of time S spent is calculated (412).

The average processing time is compared to the short duration T (414), corresponding to the target frame rate, using the following inequality:

$$((NS+CR)/N)<T$$

If the short duration T is greater than the average processing time, and the number of render frames C is less than the sample number of frames N, increment the number of render frames C (418). This allows a previously applied processing allocation modification, which now appears not to be needed (e.g., one or more competing processes have ended, complex section of the media data has passed, etc.) to be readjusted. Continue the process 400 while there are still frames to be rendered within the media data by returning to gathering time measurements (408).

If the short duration T is instead smaller than the average processing time, the average processing time is compared to the long duration F (420) using the following inequality:

$$((NS+CR)/N)>F$$

If the long duration F is greater than the average processing time, return to collecting time measurements (408). Otherwise, if a lower limit L was determined at 404, determine if the number of render frames C is less than or equivalent to the lower limit L (422). If C is less than or equal to L, return to collecting time measurements (408).

If the processing time is greater than the long duration F, and the optional lower limit L has not yet been reached, decrement the number of render frames C (424). Continue the process 400 while there are still frames to be rendered within the media data by returning to gathering time measurements (408).

In some implementations, after the process 400 has made a first adjustment, the process 400 continues to make adjustments until the average processing time approaches a duration corresponding to the target frame rate, rather than collecting another set of sample processing durations prior to making a second adjustment. Upon each adjustment period, in this case, the number of render frames C can be reset to the sample number of frames N prior to beginning the adjustment cycle.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
obtaining media data to process and display to a display device, the media data comprising multiple frames and having at least two discrete types of dynamic data for each of the multiple frames, where a first of the at least two discrete types of dynamic data has a lower priority than a second of the at least two discrete types;
identifying a target frame rate associated with the media data;
monitoring a first amount of time used to process the first type of dynamic data and a second amount of time used to process the second type of dynamic data, where the monitoring comprises combining multiple first time measurements corresponding to multiple frames for the first type of dynamic data into the first amount of time and combining multiple second time measurements corresponding to multiple frames for the second type of dynamic data into the second amount of time;
comparing a combination of the first amount of time and the second amount of time to the target frame rate; and
modifying an allocation for processing the first type of dynamic data, when the combination fails to satisfy the target frame rate, to change an actual frame rate of the media data being processed and displayed to the display device; and
repeating the monitoring, the comparing and the modifying, with hysteresis between the time measurements and the modifying.

2. The method of claim 1, wherein:
the identifying comprises determining an upper rate of the target frame rate and a lower rate of the target frame rate;
the comparing comprises comparing the combination to the lower rate and comparing the combination to the upper rate; and
the modifying comprises modifying the allocation if the combination fails to satisfy the lower rate or if the combination fails to satisfy the upper rate and the allocation, after modification, satisfies a minimum value associated with processing the first type of dynamic data.

3. The method of claim 1, wherein combining the multiple first time measurements comprises calculating a first rolling average of the first time measurements, and combining the multiple second time measurements comprises calculating a second rolling average of the second time measurements.

4. The method of claim 1, wherein obtaining the media data comprises obtaining the media data comprising video data and scripting data, monitoring the first amount of time used to process the first type of dynamic data comprises determining a time per frame spent rendering the video data, and monitoring the second amount of time used to process the second type of dynamic data comprises determining a time per frame spent interpreting the scripting data.

5. The method of claim 1, wherein:
the media data does not include per frame timing data; and
the target frame rate is derived from information separate from the media data.

6. The method of claim 1, wherein
modifying the allocation comprises modifying the allocation when the combination fails to satisfy the target frame rate and the modified allocation still satisfies a lower limit set for processing the first type of dynamic data, the modified allocation being determined by calculating a ratio of skipped frames to processed frames; and wherein for each frame of the media data, processing the first type of dynamic data includes processing the frame or skipping the frame based upon the ratio.

7. The method of claim 1, wherein comparing the combination to the target frame rate comprises comparing in accordance with an inequality, $$(NS+CR)/N>F,$$

where
N corresponds to a sample size for the multiple frames of the first type of dynamic data and the multiple frames of the second type of dynamic data,
C corresponds to the allocation,
R corresponds to the first amount of time,
S corresponds to the second amount of time, and
F corresponds to a frame duration based on the target frame rate.

8. A non-transitory computer storage medium encoded with a computer program, the program comprising instructions that when executed by data processing apparatus cause the data processing apparatus to perform operations comprising:
obtaining media data to process and display to a display device, the media data comprising multiple frames and having at least two discrete types of dynamic data for each of the multiple frames, where a first of the at least two discrete types of dynamic data has a lower priority than a second of the at least two discrete types;
identifying a target frame rate associated with the media data;
monitoring a first amount of time used to process the first type of dynamic data and a second amount of time used to process the second type of dynamic data, where the monitoring comprises combining multiple first time measurements corresponding to multiple frames for the first type of dynamic data into the first amount of time and combining multiple second time measurements corresponding to multiple frames for the second type of dynamic data into the second amount of time;
comparing a combination of the first amount of time and the second amount of time to the target frame rate; and
modifying an allocation for processing the first type of dynamic data, when the combination fails to satisfy the target frame rate, to change an actual frame rate of the media data being processed and displayed to the display device.

9. The non-transitory computer storage medium of claim 8, wherein: the identifying comprises determining an upper rate of the target frame rate and a lower rate of the target frame rate; the comparing comprises comparing the combination to the lower rate and comparing the combination to the upper rate; and the modifying comprises modifying the allocation if the combination fails to satisfy the lower rate or if the combination fails to satisfy the upper rate and the allocation, after modification, satisfies a minimum value associated with processing the first type of dynamic data.

10. The non-transitory computer storage medium of claim 8, wherein combining the multiple first time measurements comprises calculating a first rolling average of the first time measurements, and combining the multiple second time measurements comprises calculating a second rolling average of the second time measurements.

11. The non-transitory computer storage medium of claim 8, wherein obtaining the media data comprises obtaining the media data comprising video data and scripting data, monitoring the first amount of time used to process the first type of dynamic data comprises determining a time per frame spent rendering the video data, and monitoring the second amount of time used to process the second type of dynamic data comprises determining a time per frame spent interpreting the scripting data.

12. The non-transitory computer storage medium of claim 8, wherein: the media data does not include per frame timing data; and the target frame rate is derived from information separate from the media data.

13. The non-transitory computer storage medium of claim 8, wherein modifying the allocation comprises modifying the allocation when the combination fails to satisfy the target frame rate and the modified allocation still satisfies a lower limit set for processing the first type of dynamic data, the modified allocation being determined by calculating a ratio of skipped frames to processed frames;
and wherein for each frame of the media data, processing the first type of dynamic data includes processing the frame or skipping the frame based upon the ratio.

14. The non-transitory computer storage medium of claim 8, wherein comparing the combination to the target frame rate comprises comparing in accordance with an inequality, $$(NS+CR)/N > F,$$

where
N corresponds to a sample size for the multiple frames of the first type of dynamic data and the multiple frames of the second type of dynamic data,
C corresponds to the allocation,
R corresponds to the first amount of time,
S corresponds to the second amount of time, and
F corresponds to a frame duration based on the target frame rate.

15. A system comprising:
a display device;
a computer storage medium; and
one or more processors operable to interact with the display device and to perform operations comprising:
obtaining media data to process and display to the display device, the media data comprising multiple frames and having at least two discrete types of dynamic data for each of the multiple frames, where a first of the at least two discrete types of dynamic data has a lower priority than a second of the at least two discrete types;
identifying a target frame rate associated with the media data;
monitoring a first amount of time used to process the first type of dynamic data and a second amount of time used to process the second type of dynamic data, where the monitoring comprises combining multiple first time measurements corresponding to multiple frames for the first type of dynamic data into the first amount of time and combining multiple second time measurements corresponding to multiple frames for the second type of dynamic data into the second amount of time;
comparing a combination of the first amount of time and the second amount of time to the target frame rate; and
modifying an allocation for processing the first type of dynamic data, when the combination fails to satisfy the target frame rate, to change an actual frame rate of the media data being processed and displayed to the display device.

16. The system of claim 15, wherein:
the identifying comprises determining an upper rate of the target frame rate and a lower rate of the target frame rate;
the comparing comprises comparing the combination to the lower rate and comparing the combination to the upper rate; and
the modifying comprises modifying the allocation if the combination fails to satisfy the lower rate or if the combination fails to satisfy the upper rate and the allocation, after modification, satisfies a minimum value associated with processing the first type of dynamic data.

17. The system of claim 15, wherein combining the multiple first time measurements comprises calculating a first rolling average of the first time measurements, and combining the multiple second time measurements comprises calculating a second rolling average of the second time measurements.

18. The system of claim 15, wherein obtaining the media data comprises obtaining the media data comprising video data and scripting data, monitoring the first amount of time used to process the first type of dynamic data comprises determining a time per frame spent rendering the video data, and monitoring the second amount of time used to process the second type of dynamic data comprises determining a time per frame spent interpreting the scripting data.

19. The system of claim 15, wherein:
the media data does not include per frame timing data; and
the target frame rate is derived from information separate from the media data.

20. The system of claim 15, wherein
modifying the allocation comprises modifying the allocation when the combination fails to satisfy the target frame rate and the modified allocation still satisfies a lower limit set for processing the first type of dynamic data, the modified allocation being determined by calculating a ratio of skipped frames to processed frames; and wherein
for each frame of the media data, processing the first type of dynamic data includes processing the frame or skipping the frame based upon the ratio.

\* \* \* \* \*